United States Patent [19]

Durinck

[11] Patent Number: 5,975,180
[45] Date of Patent: Nov. 2, 1999

[54] MACHINE FOR THE PRODUCTION OF PANELS INCLUDING SPECIFIED DISPLACEMENT MEANS

[75] Inventor: Jean Durinck, Bruyeres Le Cahatel, France

[73] Assignee: Cardo Door France, Lisses, France

[21] Appl. No.: 08/827,425

[22] Filed: Mar. 27, 1997

[30] Foreign Application Priority Data

Mar. 27, 1996 [FR] France ................................ 96 03796

[51] Int. Cl.$^6$ ............................... B26D 3/06; B31F 1/00; B32B 3/12; B32B 31/04
[52] U.S. Cl. .......................... 156/510; 83/876; 83/425.2; 156/197; 156/211; 156/539; 156/543
[58] Field of Search .................... 156/197, 211, 156/510, 539, 543, 547, 549, 552, 555, 556, 559; 83/875, 876, 879, 885, 425.2; 198/606, 620, 626.1; 29/6.1, 6.2; 493/331–337, 966, 345, 352, 461

[56] References Cited

U.S. PATENT DOCUMENTS 2,731,379  1/1956  Wheeler .
3,684,618  8/1972  Geschwender .

FOREIGN PATENT DOCUMENTS 1. 594. 600   6/1970   France .
2 423 845   12/1974   Germany .
  783362    9/1957   United Kingdom .
 1060121    2/1967   United Kingdom .

*Primary Examiner*—Adrienne C. Johnstone
*Attorney, Agent, or Firm*—Young & Thompson

[57] ABSTRACT

In a process and apparatus for the production of panels, plates or sheets are cemented on opposite sides of an intermediate layer of honeycomb with transverse openings constituted by a network of strips of constant width defining the openings. The edges of the strips defining the network are cemented on opposite sides of the layer and the plates or sheets are applied on the cemented edges. Two lateral parallel grooves are formed intermediate the thickness of the longitudinal edges of the intermediate layer with the layer contracted, such that the strips are flat against each other. Then these grooves are used to guide the layer when the layer is pulled out to form the openings. The necessary reduction of the width of the layer is effected by inserting two lateral convergent guides in the grooves on opposite edges of the layer, and forcing the layer to move in the direction of convergence of these guides.

6 Claims, 3 Drawing Sheets

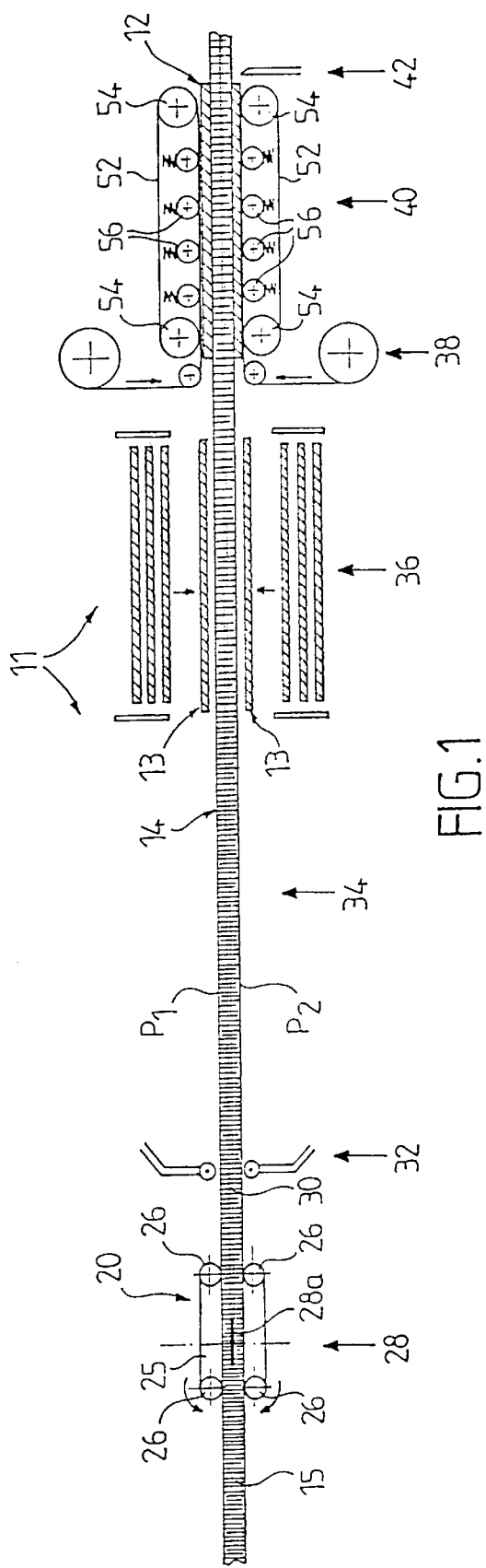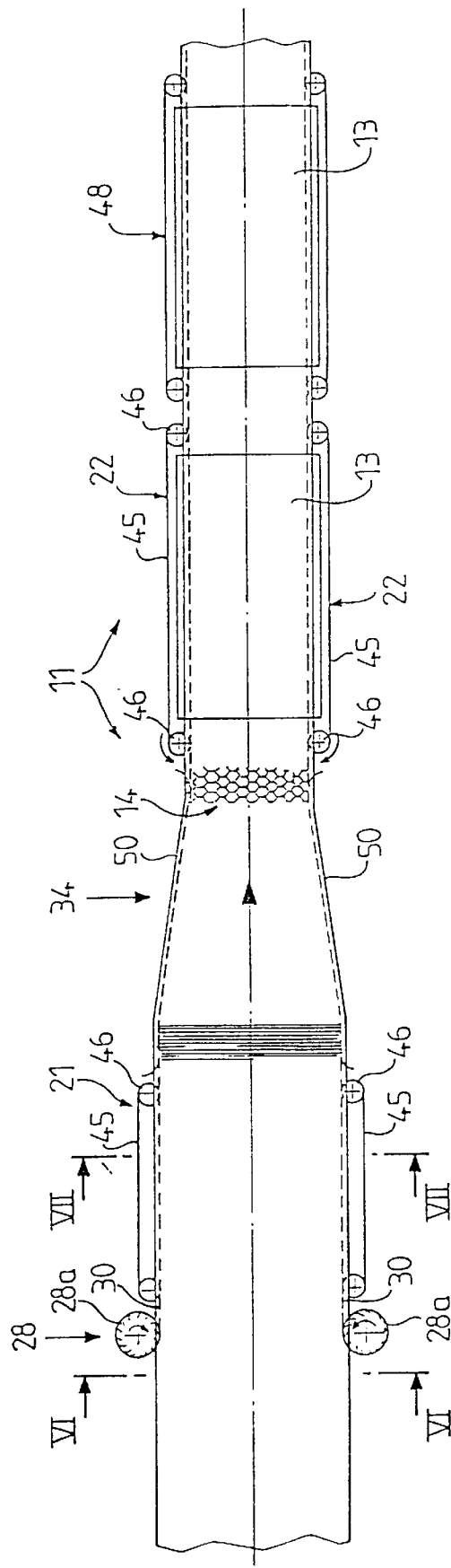

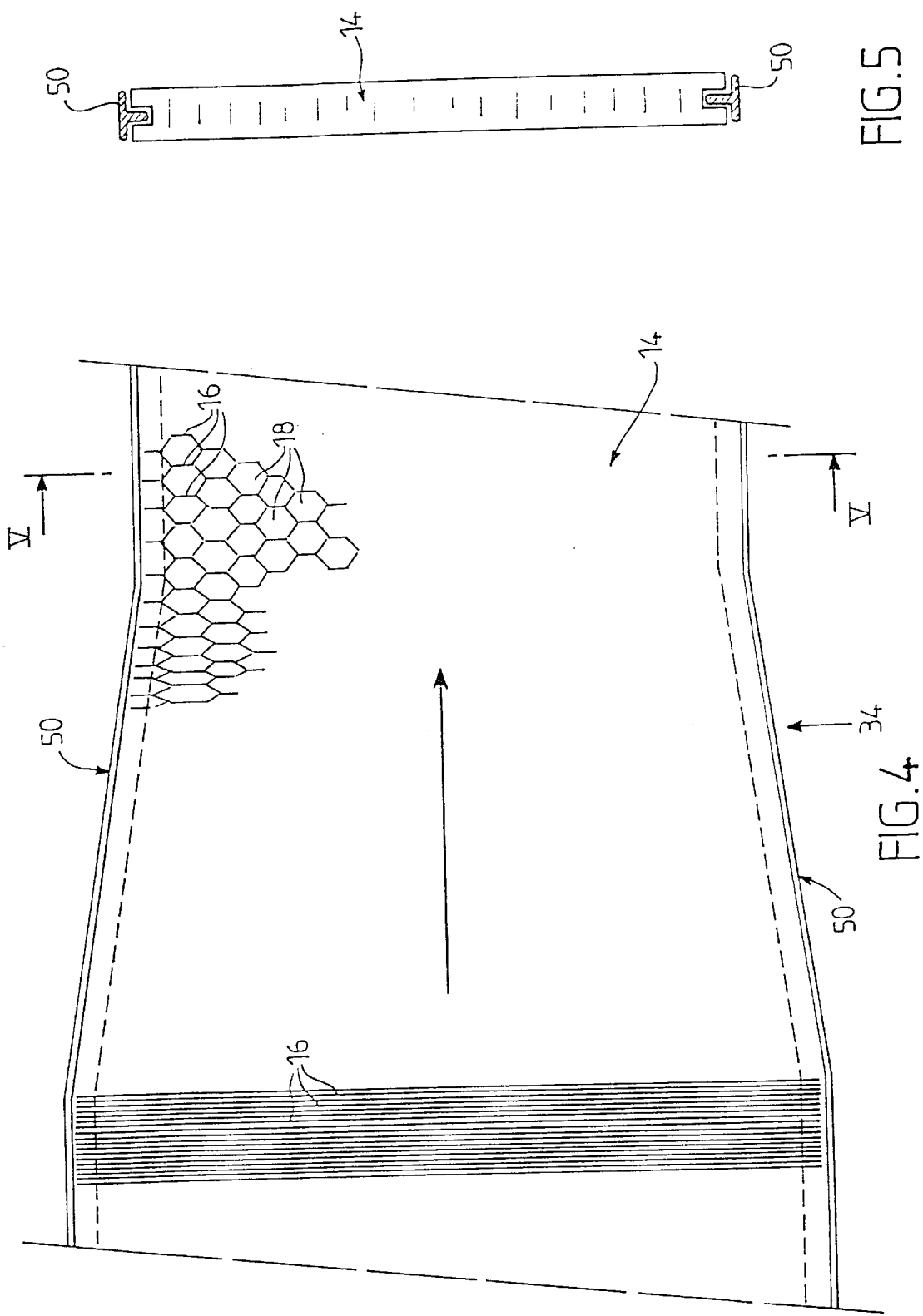

5,975,180

MACHINE FOR THE PRODUCTION OF PANELS INCLUDING SPECIFIED DISPLACEMENT MEANS

FIELD OF THE INVENTION

The invention relates to a process for the production of composite panels called "sandwich" panels, in which two plates or sheets are cemented on opposite sides of an intermediate layer of transverse recesses, constituted by a network of strips of constant width defining said recesses. The invention is preferably applicable to the practice of a process in which said median layer can be present first in a contracted condition, said strips being substantially in contact with each other, then be deployed to cause the recesses to appear. These latter are preferably of hexagonal shape, of beehive configuration. The invention also relates to a machine for practicing the process.

BACKGROUND OF THE INVENTION

The structure described above of a composite sandwich panel is known, but its production poses problems. In particular, the median layer is difficult to manipulate and to position because of its deformability. A known process consists in deploying a median layer of the dimensions of one panel, so as to form recesses that are as regular as possible, then separately and uniformly cementing the two plates and applying them on opposite sides of the median layer, on the edges of the recesses. The cemented plates are difficult to handle. It is necessary to apply them one after the other on the intermediate layer. There is a large consumption of cement.

SUMMARY OF THE INVENTION

The invention permits overcoming these drawbacks.

More particularly, the invention relates to a process for the production of panels consisting in cementing the plates or sheets on opposite sides of an intermediate layer with transverse recesses, constituted by a network of strips of constant width defining said recesses, characterized in that it consists in cementing the edges of the strips defining the network, on opposite sides of the intermediate layer and applying the plates or sheets on these cemented edges.

According to a desirable feature of the invention, there is effected the operation consisting in cementing the edges of the strips, when the intermediate layer is in the contracted condition, the strips being substantially in contact with each other, and then the intermediate strip is opened to cause the recesses to appear, before applying to them the plates or sheets. The cementing of the edges is thus carried out under best conditions with minimum consumption of cement.

According to another important characteristic of the invention, two lateral parallel grooves are provided in the thickness of the longitudinal edges of the intermediate layer before its deployment and these grooves are used for guiding the layer. Thus, the latter is supported and maintained in its own plane, without having to rest on a flat surface. The cementing can take place over all the surface, particularly the edges and simultaneously on the two surfaces. The plates or sheets can also be applied simultaneously on the two cemented sides of the layer. This arrangement therefore permits practically continuous industrial production.

The invention also relates to a machine for the production of panels, comprising an intermediate layer with transverse openings, constituted by a network of strips of constant width, on opposite sides of which are cemented plates or sheets, characterized in that it comprises means for displacing said layer and that along these displacement means are arranged, in the direction of movement of the layer, a cementing station for the edges of the strips and an application station for the plates or sheets on the cemented edges.

BRIEF DESCRIPTION OF THE DRAWINGS

The invention will be better understood from the description which follows, of continuous machines for the production of panels using the principle of the invention, given by way of example and with respect to the accompanying drawings, in which:

FIG. 1 is a schematic elevational view showing the principle of a machine for production of composite panels, according to the invention;

FIG. 2 is a top plan view of FIG. 1;

FIG. 4 is a view from above, on a larger scale, of the station for opening the intermediate layer;

FIG. 5 is a section on the line V—V of FIG. 4;

DETAILED DESCRIPTION OF THE INVENTION

Figure 3:
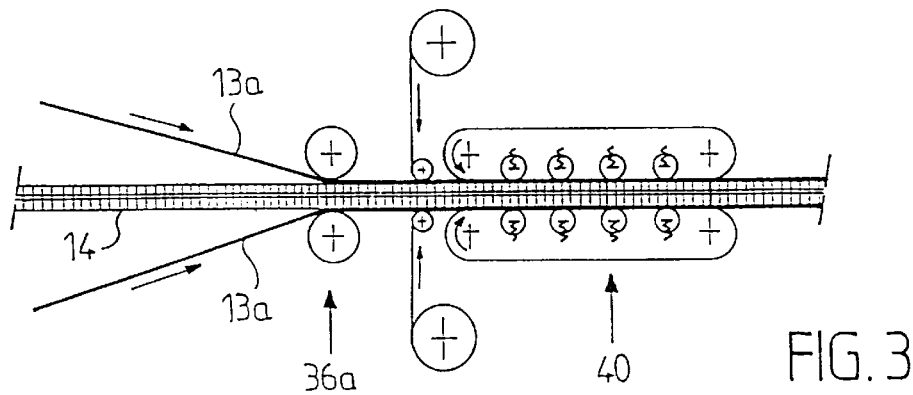
FIG. 3 is a fragmentary elevational view, analogous to FIG. 1, showing a modification of the machine.
Figure 6:
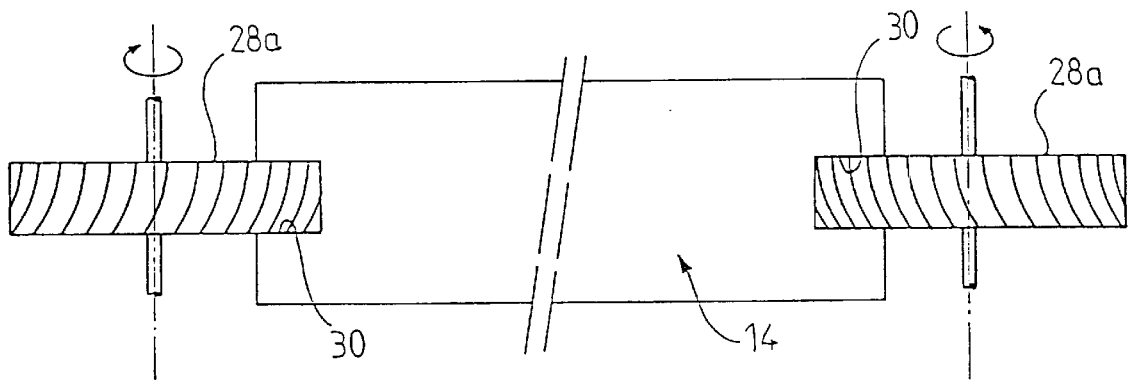
FIG. 6 is a section on the line VI—VI, on a larger scale, of FIG. 2.

Referring to the drawings, there will be seen the principal elements of a production machine 11 for panels 12 of composite structure. According to the example of FIGS. 1 and 2, these panels are constituted by the assembly of an intermediate layer 14 with transverse openings (here extending vertically through the thickness of the layer) and two plates 13 cemented on opposite sides of the intermediate layer. This latter is present in the form of a wide continuous plate 15, which is thick, constituted by a network of strips 16 of constant width, adapted to define the transverse openings 18, which are here of hexagonal shape in a honeycomb arrangement.

The width of the strips 16 defines the thickness of said wide continuous plate 15. More precisely, these strips 16, for example of cardboard, are cemented side by side on segments of predetermined length spaced a double distance apart. This layer can therefore be present in the contracted condition when all the strips are flattened against each other, forming a compact assembly, or else can be deployed in a predetermined direction, here the longitudinal direction of the machine, to form the honeycomb recesses. This deployment is particularly visible in FIG. 4: it is accompanied by a reduction of width of the layer 14 in the direction perpendicular to the direction of deployment. The machine 11 is adapted to cause such an intermediate layer 14 to move in its own plane, first in the contracted condition, the strips 16 being all parallel and side by side, then in the deployed condition, the strips 16 defining between them the recesses 18. It will be seen clearly from the above that the edges of the strips, which is to say also the edges of the ends of the recesses 18, are located in two parallel planes P1 and P2 to which the plates 13 will be cemented to form a rigid panel. The machine 11 comprises displacement means 20, 21, 22 for this continuous layer, to cause it to move longitudinally past one treatment station to another. The direction of movement is left to right as shown in FIGS. 1 and 2. The displacement means 20 is constituted by two flat belts 25 of the same width as the machine, driven by rollers 26 themselves driven by an electric motor (not shown). This permits driving the intermediate layer 14 in the contracted condition. The other displacement means of the intermediate layer 14 will be described later on.

Overall, the machine comprises (successively or from upstream to downstream with respect to the direction of movement of the intermediate layer 14) a scoring station 28 to provide two lateral grooves 30, a cementing station 32, to cement the edges of the recesses of the layer 14 (in the planes P1 and P2), an opening station 34 for the layer 14, a station 36 for applying the plates 13, an unrolling station 38 for a protective film, a pressing station 40 and a transverse cutting station 42.

The scoring station 28 is arranged adjacent the displacement means 20 mentioned above. It comprises two scoring wheels 28a spaced on each side of the layer 14 and positioned to provide the two lateral grooves 30 along the middle of the longitudinal edges of the intermediate layer 14. The grooves 30 are provided when the layer is in the contracted condition because the opening station is located downstream thereof. The cementing station 32 is preferably arranged upstream of the opening station 34 and downstream of the scoring station 28. Cementing is also carried out on the edges of the strips constituting the intermediate layer 14, the latter being in the contracted condition. The cement is applied over all the width of the layer passing thereby. There is thus obtained a complete gluing of the edges with a relatively small quantity of glue.

Figure 7:
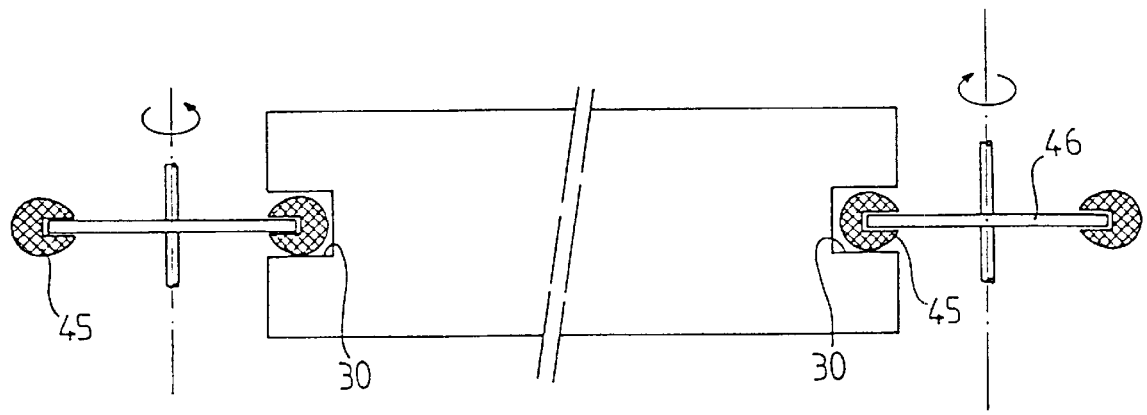
FIG. 7 is a cross-sectional view on the line VII—VII, on a larger scale, of FIG. 2.

The displacement means 21 and 22 mentioned above coact with the grooves 30 to maintain the layer 14 in its plane and to displace it longitudinally without other support to the pressing station 40, while leaving free its sides, which permits total cementing of the edges of the recesses. The cementing can nevertheless be partial, in strips, lines or islands. The displacement means 21 or 22 comprises two drive belts 45 one on each side of the layer 14. Each is mounted between pulleys such as two pulleys 46 and engaged over a certain length within the grooves 30 along certain sections of the layer. Some, preferably one of the pulleys of each belt is motor driven and actuated by an electric motor (not shown). Thus, the displacement means 21 is arranged adjacent the cementing station 32, whilst the displacement means 22 is arranged adjacent the application station 36 for the plates 13. Each belt 45 is of elastomeric material and has a substantially circular cross section and comprises a groove in which the pulleys 46 engage. These latter are flat and can thus engage in the groove 30 (see FIG. 7). A guide unit 48 similar to the displacement means 21 or 22, but not motor driven, is arranged adjacent the pressing station 40. It is to be noted that, so as not to complicate the drawings, the displacement means 20, the cementing station 32, the application station 36, the pressing station 40 and the cutting station 42 are visible only in FIG. 1, whilst the displacement means 21 and 22 and the guide unit 48 are visible only in FIG. 2.

The opening station 34 is essentially comprised by two lateral guides 50 of preferably T shape cross section, coplanar and converging toward each other (see FIGS. 2, 4 and 5). They extend between the displacement means 21 and 22. These guides 50 are engaged in the grooves 30 of the layer 14. They are thus shaped and oriented to impose a lateral contraction of the layer 14 when the latter moves horizontally. The contraction gives rise to the automatic formation of the openings 18.

The pressing station 40 is comprised by two wide belts 52 (of the width of the panels) mounted between rollers 54.

Pressing means 56, which can if desired be heated to activate the cement, permit pressing the two plates 13 on opposite sides of the intermediate layer 14 onto the cemented edges, to achieve the formation of the panels.

In the modification of FIG. 3, the plates 13 are replaced by sheets 13a which are relatively more flexible and which can be unrolled and applied continuously on opposite sides of the layer 14. The continuous application station 36a is thus substituted for the application station of FIG. 1. The pressing station 40 is not modified; the other stations, not visible in FIG. 3, are similar to those of the previous embodiment.

It will be noted that the layer 14 is entirely maintained and guided thanks to its grooves 30. In the first instance, the guides are parallel and their spacing corresponds to the width of the layer in the contracted condition. Then the guides progressively approach each other, giving rise to the formation of the openings. Finally, the guides return to parallel condition and their spacing corresponds to the width of the panels.

The operation of the machine which has been described constitutes a possible practice of the process defined above. However, it is possible to cement the edges of the openings 18 after deployment of the layer 14.

What is claimed is:

1. In a machine for the production of panels each comprising an intermediate layer with transverse openings constituted by a network of strips of constant width, on opposite sides of which are cemented plates or sheets, the machine comprising displacement means for said layer and, along these displacement means, a cementing station for the edges of said strips, an application station for applying said plates or sheets to said cemented edges and an opening station for said intermediate layer in which the layer passes from a contracted condition with said strips substantially lying against each other to a deployed condition in which said openings are present; the improvement comprising a scoring station for providing two lateral grooves midway of the thickness of longitudinal edges of the intermediate layer and extending along the length of said intermediate layer, said scoring station being disposed upstream of said opening station in the direction of movement of said layer, said displacement means engaging in said grooves.

2. Machine according to claim 1, wherein said opening station comprises two lateral guides converging toward each other and extending for a predetermined length within said grooves of said layer.

3. Machine according to claim 1, wherein said displacement means comprises drive belts mounted between pulleys and engaged in said grooves along certain sections of said layer, some of said pulleys being motor driven.

4. Machine according to claim 1, wherein said station for applying said plates or sheets is an application station for applying individual plates or sheets on opposite sides of said layer and the machine further comprises a pressing station arranged downstream of said application station in the direction of movement of said layer.

5. Machine according to claim 1, wherein said station for applying said plates or sheets is a continuous application station for applying two sheets on opposite sides of said layer, and the machine further comprises a pressing station arranged downstream of said application station in the direction of movement of said layer.

6. Machine according to claim 1, wherein said cementing station is located upstream of said opening station with respect to the direction of movement of the layer.

* * * * *